US009734695B2

(12) United States Patent
Henry et al.

(10) Patent No.: US 9,734,695 B2
(45) Date of Patent: Aug. 15, 2017

(54) ACTIVITY MONITORING APPARATUS

(71) Applicant: Nissan North America, Inc., Franklin, TN (US)

(72) Inventors: Marlene Henry, Nashville, TN (US); Elsa Foley, Brentwood, TN (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 14/881,284

(22) Filed: Oct. 13, 2015

(65) Prior Publication Data

US 2017/0103638 A1 Apr. 13, 2017

(51) Int. Cl.

| | |
|---|---|
| ***B60Q 1/00*** | (2006.01) |
| ***G08B 21/24*** | (2006.01) |
| ***G08B 3/10*** | (2006.01) |
| ***G08B 6/00*** | (2006.01) |
| ***G08B 5/36*** | (2006.01) |

(52) U.S. Cl.

CPC ........... *G08B 21/24* (2013.01); *G08B 3/1016* (2013.01); *G08B 5/36* (2013.01); *G08B 6/00* (2013.01)

(58) Field of Classification Search

CPC combination set(s) only.

See application file for complete search history.

(56) References Cited

U.S. PATENT DOCUMENTS 5,949,340 A 9/1999 Rossi
6,489,889 B1 12/2002 Smith
6,727,823 B2 4/2004 Ando et al.
6,922,147 B1 7/2005 Viksnins et al.
6,922,622 B2 7/2005 Dulin et al.
7,079,016 B2 7/2006 Ho et al.
7,106,203 B2 9/2006 Edwards et al.
7,170,401 B1 1/2007 Cole
8,154,394 B2 4/2012 Hansen
8,493,201 B2 7/2013 Orbach
2003/0122662 A1 7/2003 Quinonez
2005/0200465 A1 9/2005 Fabors et al.
2008/0218381 A1 9/2008 Buckley et al.
2011/0102169 A1* 5/2011 Orbach .................. B60N 2/002 340/457
2011/0187492 A1* 8/2011 Newman ................ G05B 19/00 340/5.2

(Continued)

*Primary Examiner* — Brian Zimmerman
*Assistant Examiner* — Cal Eustaquio
(74) *Attorney, Agent, or Firm* — Global IP Counselors, LLP

(57) ABSTRACT

A vehicle component moves between a first position exposing a rearward area of a vehicle interior and a second position at least partially concealing the rearward area. A movement detection device senses movement of the vehicle component. A vehicle ignition device within the vehicle body structure is operated by a vehicle operator. A controller is operably connected to the movement detection device, the vehicle ignition device and an alerting device. The controller detects movement of the vehicle component and operation of the vehicle ignition device in predetermined sequences of movement and operation. The controller thereafter determines whether or not the vehicle operator has potentially left an object in the rearward area. In response to determining that the vehicle operator may have left an object in the rearward area of the vehicle interior, the controller provides an alarm signal.

20 Claims, 5 Drawing Sheets

(56) References Cited

U.S. PATENT DOCUMENTS

| | | | | |
|---|---|---|---|---|
| 2012/0050021 | A1* | 3/2012 | Rao | B60N 2/002 340/425.5 |
| 2012/0268265 | A1 | 10/2012 | Morley et al. | |
| 2014/0015664 | A1 | 1/2014 | Watson | |
| 2014/0070929 | A1* | 3/2014 | Myers | B60R 25/10 340/426.18 |
| 2015/0266395 | A1 | 9/2015 | Bradley et al. | |
| 2016/0031342 | A1* | 2/2016 | Camello | B60N 2/002 701/45 |
| 2016/0042616 | A1* | 2/2016 | Dorsey | G08B 21/24 340/457 |
| 2016/0144781 | A1 | 5/2016 | Kleinert et al. | |
| 2016/0221583 | A1 | 8/2016 | Valeri et al. | |

* cited by examiner

ACTIVITY MONITORING APPARATUS

BACKGROUND

Field of the Invention

The present invention generally relates to a vehicle activity monitoring apparatus. More specifically, the present invention relates to vehicle activity monitoring apparatus configured to monitor activity of a vehicle operator and warn the vehicle operator in response to determining that the vehicle operator has have left an object in a rearward portion of the vehicle.

Background Information

Vehicle operators and passengers routinely use a rearward portion of a vehicle interior to load cargo or other objects to be taken to a predetermined destination. Occasionally the vehicle operator forgets that the cargo or other objects have been left within the vehicle.

SUMMARY

An object of the present disclosure is to provide a vehicle with an apparatus that monitors vehicle operator activity and based upon that activity warn the vehicle operator that cargo or other objects have apparently been left in a rearward interior portion of the vehicle, such as the back seat of the vehicle.

In view of the state of the known technology, one aspect of the present disclosure is to provide a vehicle with an activity monitoring apparatus that includes a vehicle body structure, a vehicle front door, a front door movement detection device, a vehicle component, a movement detection device, a vehicle ignition device, an alerting device and a controller. The vehicle body structure defines a vehicle interior. The vehicle front door is fixed to the vehicle body structure for movement between an open orientation and a closed orientation. The front door movement detection device is configured to sense movement of the front door. The vehicle component attached to the vehicle body structure for movement between a first position exposing a rearward area of the vehicle interior and a second position at least partially concealing the rearward area of the vehicle interior. The movement detection device is installed within the vehicle body structure and is coupled to the vehicle component sensing movement of the vehicle component between the first position and the second position. The vehicle ignition device is located within the vehicle body structure and is operated by a vehicle operator to control operation of a vehicle engine. The alerting device configured to provide an alarm signal. The controller is operably connected to each of the front door movement detection device, the movement detection device, the vehicle ignition device and the alerting device. In response to the controller detecting a sequence of events based on movement of the front door via signals from the front door movement detection device, movement of the vehicle component via signals from the movement detection device and detection of operation of the vehicle ignition device, the controller determines whether or not the vehicle operator has potentially left an object in the rearward area of the vehicle interior. In response to determining that the vehicle operator has potentially left an object in the rearward area of the vehicle interior, the controller operates the alerting device to provide the alarm signal to the vehicle operator.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
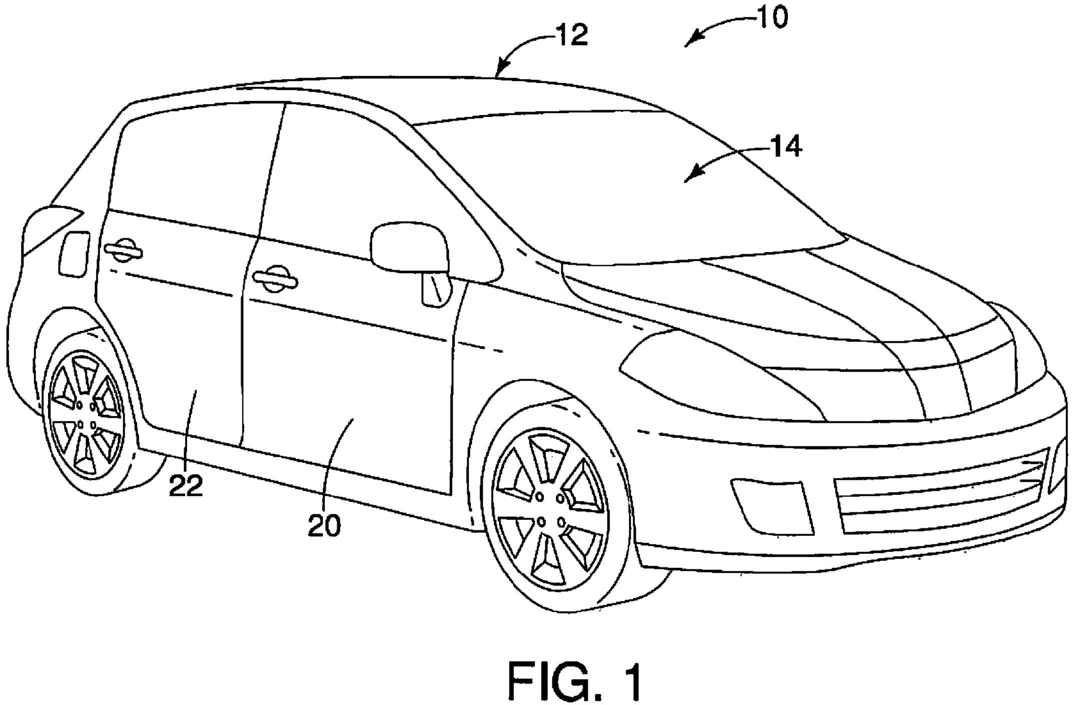
FIG. 1 is a perspective view of a vehicle having front doors, rear doors in closed orientations and an activity monitoring apparatus in accordance with a first embodiment.
Figure 2:
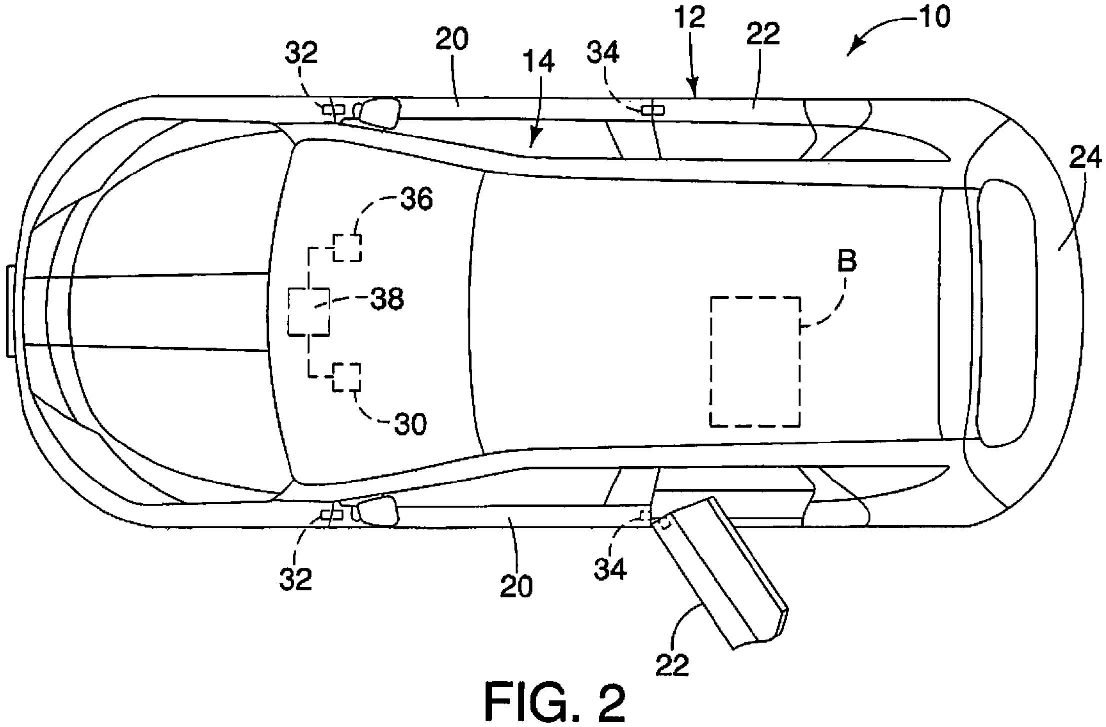
FIG. 2 is a top view of the vehicle showing one of the rear doors in an open orientation in accordance with the first embodiment.

Referring initially to FIGS. 1 and 2, a vehicle 10 is illustrated in accordance with a first embodiment. The vehicle 10 includes a vehicle body structure 12 that defines a vehicle interior 14 and includes an activity monitoring apparatus 16 within the vehicle 10, as shown in FIG. 2. The vehicle interior 14 can be a passenger compartment within the vehicle 10 or can be the passenger compartment combined with a cargo area at the rear of the vehicle 10, depending upon the overall design and configuration of the vehicle 10.

In a first embodiment, the vehicle 10 is a hatchback vehicle that has four passenger access doors including two front doors 20, two rear doors 22 and a rear hatch door 24. The front doors 20 are fixed to the vehicle body structure 12 for movement between an open orientation and a closed orientation in a conventional manner. Similarly, the rear doors 22 (vehicle components) are attached to the vehicle body structure 12 for movement between a first position exposing rear seats (not shown) within the vehicle interior 14 and a second position at least partially concealing the rear seats of the vehicle interior 14. The area of the passenger compartment having the rear seats and accessed by the rear doors 22 is also referred to herein as one example of a rearward area of the vehicle interior 14.

Figure 3:
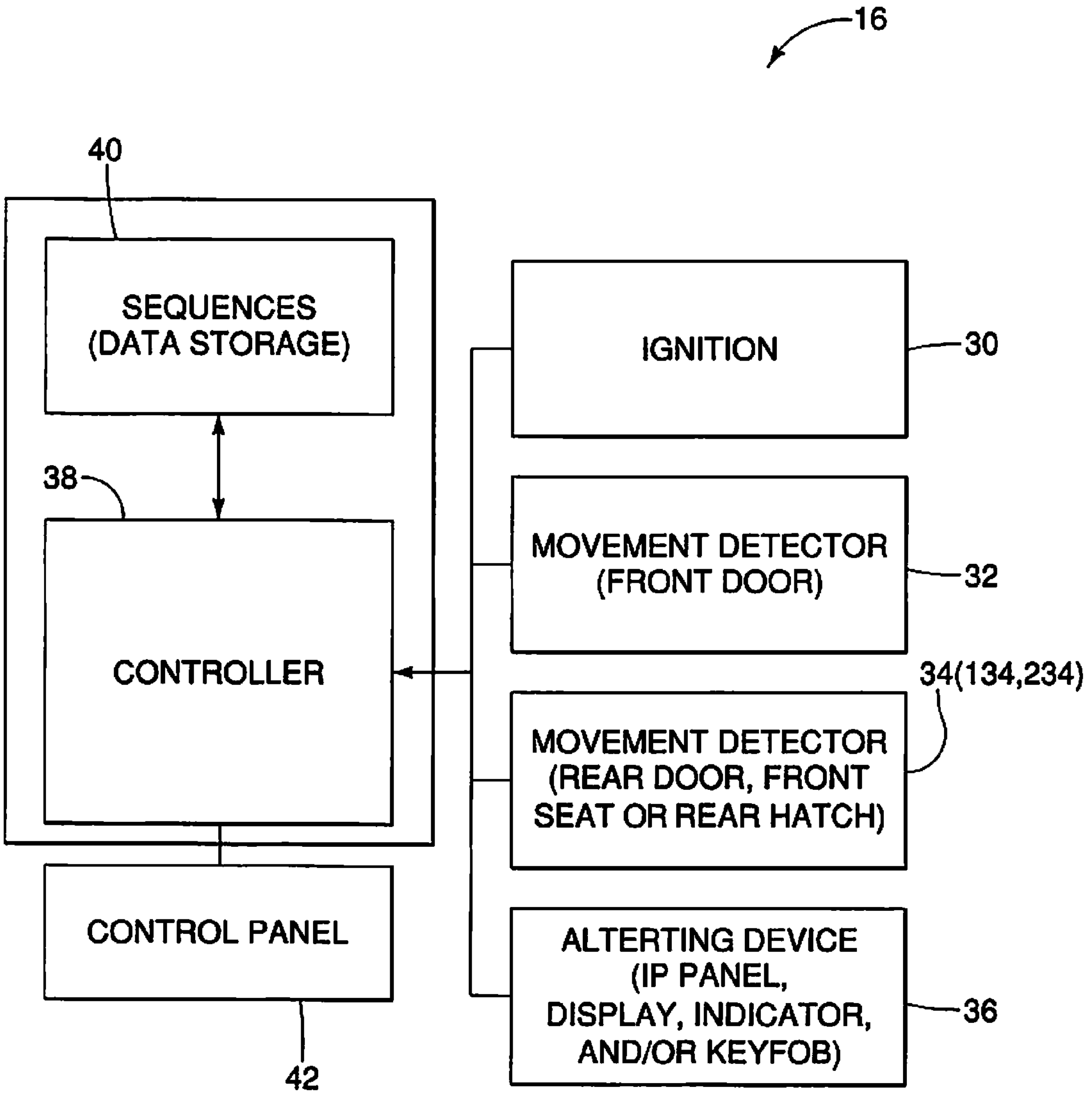
FIG. 3 is a block diagram showing elements of the activity monitoring apparatus of the vehicle in accordance with the first embodiment.

As shown in FIG. 3, the activity monitoring apparatus 16 includes an ignition switch 30 (an ignition device), a first set of movement detectors 32, a second set of movement detectors 34, an alerting device 36 and a controller 38. As shown in FIG. 2, the ignition switch 30, the first movement detectors 32, the second movement detectors 34, the alerting device 36 and the controller 38 are all installed within the vehicle interior 14.

The ignition switch 30 is configured to control on and off operation of an engine (not shown) within the vehicle 10 in a conventional manner. Since the ignition switch 30 is a conventional vehicle element, further description is omitted for the sake of brevity.

The first movement detectors 32 are positioned within the vehicle body structure 12 such that they are able to transmit a signal to the controller 38 each time one of the front doors 20 is opened and/or closed. Similarly the second movement detectors 34 are positioned within the vehicle body structure 12 such that they are able to transmit a signal to the controller 38 each time one of the rear doors 22 is opened and/or closed. In the depicted embodiment, each of the first movement detectors 32 are able to independently send signals to the controller 38 such that the controller 38 can determine whether the driver's door of the front doors 20 has been opened or closed independently of activity of the passenger's front door.

The first movement detectors 32 and the second movement detectors 34 can be any of a variety of devices. For example, the first movement detectors 32 and the second movement detectors 34 can conventional switches that also serve to turn vehicle interior lights (not shown) on when any one of the doors 20 and 22 is opened, or can be dedicated switches installed solely to operate with the controller 38 in a manner described in greater detail below.

The alerting device 36 can be any of a variety of device, such as a convention vehicle security alarm or can be a dedicated alarm device installed within the vehicle 10 and configured to operate solely with the controller 38 in a manner described in greater detail below. Further, the alerting device 36 can include a display (not shown) installed to the instrument panel within the vehicle interior 14 and the alarm signal includes a visual signal provided on the display. More specifically, the alerting device 36 provides an alarm signal or alert signal such as an audible sound and/or a visual alert. Alternatively, the alerting device 36 can be included in a keyfob (not shown) that is configured to remotely lock and unlock the doors 20 and 22. The keyfob (not shown) can be configured to provide an audible alarm and/or a vibration (vibratory alert) that also serves as an alarm or alert to the vehicle operator. Further, the vehicle 10 can be provided with the alerting device 36 as described above, installed within the vehicle 10, in concert with the separate handheld keyfob (not shown) typically kept in the vehicle operator's pocket or purse.

A description of the controller 38 is now described with reference to FIG. 3 and the logic steps set forth in FIG. 4. As shown in FIG. 3, the controller 38 is operably connected to each of the ignition device 30, the front door movement detection devices 32, the component movement detection devices 34 and the alerting device 36. The controller 38 also includes a data storage portion 40 that stores data such as activity related information and a control panel 42, as is described in greater detail below.

The controller 38 is configured such that in response to the controller 38 detecting and determining that predetermined sequences of activity events have occurred, the controller 38 operates the alerting device 36 to provide the alarm signal to the vehicle operator. The predetermined sequences of activity events are based on movement of the front door(s) 20 as detected via signals from the front door movement detection devices 32, movement of the rear doors 22 (the vehicle component in the first embodiment) via signals from the movement detection devices 34 and detection of operation of the vehicle ignition device 30. Using the detected activity events, the controller 38 determines whether or not the vehicle operator has potentially place an object B or objects B in the rearward area of the vehicle interior 14, and in response to determining that the vehicle operator has potentially left the object B in the rearward area (the rear seat) of the vehicle interior 14 the controller 38 operates the alerting device 36 to provide an alarm or alert signal to the vehicle operator warning the vehicle operator that the object B appears to still be in the rearward area (the rear seat). The control panel 42 is configured to be manually operated by the vehicle operator such that the vehicle operator can manually activate and de-activate the activity monitoring apparatus 16. The control panel 42 can be a separate panel of the instrument panel (not shown) of the vehicle 10, or can be part of other input systems incorporated into the instrument panel, such as a vehicle operation monitoring system.

The vehicle 10 can be provided with a means for activating and de-activating the activity monitoring apparatus 16. For example, the instrument panel of the vehicle 10 can be provided with a switch and/or an interactive display that includes a menu for activating and de-activating the activity monitoring apparatus 16.

Figure 4:
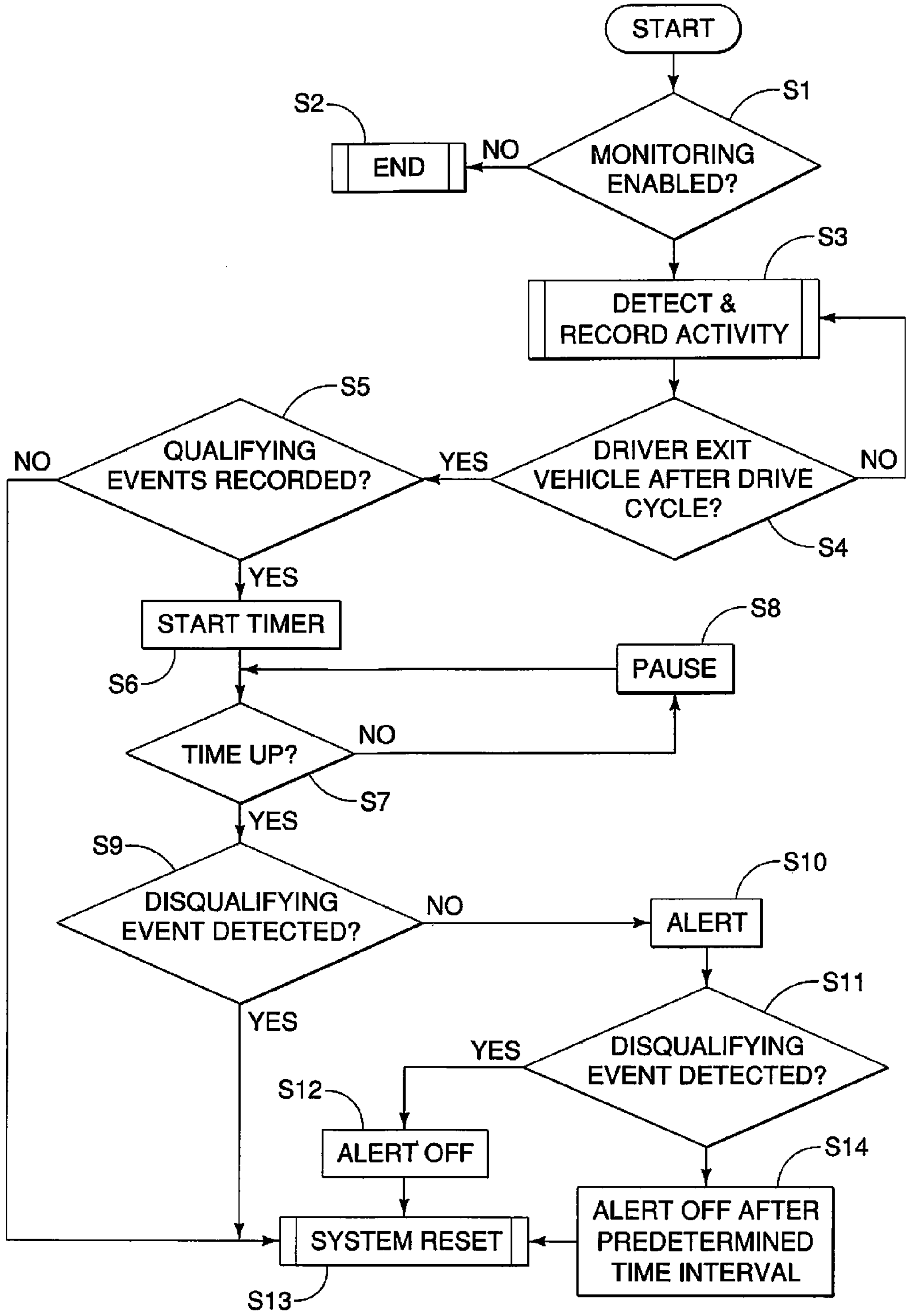
FIG. 4 is a flowchart showing basic operational steps of the activity monitoring apparatus in accordance with the first embodiment.

FIG. 4 shows an example of basic logic used in the operation of the activity monitoring apparatus 16. Specifically, the controller 38 starts operating in response to any of a variety of factors, such as the keyfob (not shown) being in proximity of the vehicle 10, or operation of the keyfob to unlock the doors of the vehicle 10. The controller 38 looks into the data storage 40 and determines whether or not the activity monitoring apparatus 16 has been activated for operation by the vehicle operator, as manually selected via the control panel 42. At step S1, the controller 38 determines whether or not the activity monitoring apparatus 16 has been activated or de-activated. If not, operation moves to step S2 and no further actions are taken. If the activity monitoring apparatus 16 has been activated, then the controller 38 moves to step S3 where various activities in and around the vehicle 10 are detected and recorded in sequence. Specifically, the activities are recorded in the order that they occur. The activities detected and recorded include at least the following actions: opening the front doors 20 as sensed by the movement detectors 32; closing of the front doors 20 as sensed the movement detectors 32; opening of the rear doors 22 as sensed by the movement detectors 34; closing of the rear doors 22 as sensed by the movement detectors 34; operation of the ignition device 30 to start the engine; and operation of the ignition device 30 to stop the engine, the stopping of the engine defining the end of a driving cycle. Each of the above activities is performed by the vehicle operator or a passenger. Thus, the activity monitoring apparatus 16 monitors human activity, and specifically, human interaction with the vehicle 10.

At step S4, the controller 38 determines whether or not the driver has exited the vehicle 10 by evaluating the recorded activity. For instance, if the driving cycle is in progress (the engine is still running) or if the engine has been turned off at the completion of a driving cycle, the controller 38 checks to see whether the front door 20 has been opened indicating that the vehicle operator has exited the vehicle 10. If not, operation returns to step S3 where further activity is recorded. If yes, then operation moves to step S5 where the controller 38 further evaluates the recorded events.

At step S5, the controller 38 evaluates the recorded data and uses any of a variety of schemes to determine whether or not the recorded events qualify as events that might trigger an alert. Qualifying events include opening and closing of one of the rear doors 22 (vehicle component in the first embodiment) indicating that an object was likely put on to the back seat or within the rearward area of the vehicle interior 14; thereafter closing the front door 20 and operating the engine; opening of the front door 20 by the vehicle operator, but not opening the rear door 22 to retrieve the alleged object in the rear area of the vehicle interior 14. This sequence of activity indicates that the vehicle operator has left an object in the rear area of the vehicle interior 14 and needs to be reminded that the object or objects remain in the rear area of the vehicle interior 14. Several examples of the sequence of events of recorded activity that indicate an object is left behind in the vehicle are further described below after completion of the description of the flowchart in FIG. 4.

In step S5, if the controller 38 determines that the vehicle operator did not likely leave an object within the vehicle, then operation moves to step S13. However, if in step S5, the controller 38 determines that the vehicle operator did likely leave an object within the vehicle, then operation moves to step S6. At step S6 a timer within the controller 38 begins clocking a predetermined time interval. The predetermined time interval can vary, but in the depicted embodiment, the predetermined time interval is between 20 and 40 seconds.

Next, operation moves to step S7 where the controller 38 checks to see if the predetermined time interval has elapsed. If the time interval has not elapsed, operation moves to step S8 where the controller 38 pauses for 2 or three seconds before returning to step S7. If the time interval has elapsed, operation moves to step S9.

In step S9, the controller 38 determines whether or not a disqualifying event has occurred in the time interval between step S5 and step S9. One example of a disqualifying event is the opening of the rear door 22 indicating that the object in the rear seat area has been retrieved by the vehicle operator. If such an event has occurred, operation moves to step S13. If no such event has been detected, operation moves to step S10, where the alerting device 36 is triggered by the controller 38 to provide an alarm, thereby alerting the vehicle operator that an object may have been left within the rearward area of the vehicle interior 14.

Operation then moves to step S11, where the controller S11 again determines whether or not whether or not a disqualifying event has occurred after step S9 and/or step S10. Specifically, the controller 38 determines whether or not one of the rear doors 22 has been opened to retrieve the object therein. If the door has been opened, the controller 38 moves operation to step S12 where the alert device 36 is shut off ending the alarm. If no disqualifying event has occurred in step S11 (i.e., the rear doors 22 have not been opened), then operation moves to step S14. At step S14, the controller 38 continues to enable the alerting device 36 to issue an alarm for a predetermined time interval (for example 1-2 minutes), then cease and move to step S13 where the activity monitoring apparatus 16 resets and is ready to start its cycle again one the vehicle 10 is operated again.

Using the above basic logic, the controller 38 determines whether or not the vehicle operator has potentially left an object in the rearward area of the vehicle interior 14. This determination is made by the controller 38 in response to detecting movement of the vehicle component (the rear doors 22) via signals from the movement detection device 34, detecting operation of the vehicle ignition device 30 and detecting operation of the front doors indicating location of the vehicle operator, in predetermined sequences of movement and operation. If it is determined that an object appears to have been left within the vehicle, the controller 38 provides an alarm signal to the vehicle operator in the hopes that the vehicle operator will retrieve the object.

There are many possible sequences of events that can trigger the controller 38 to issue an alert indicating that the vehicle operator has left an object in the rearward area of the vehicle interior 14. The following tables provide several examples of qualifying sequences of events.

TABLE 1

| Sequence | System Condition<br>Engine | Driver Door | Rear Door(s) | Meter Display Alert | System Timer | Alarm Alert |
|---|---|---|---|---|---|---|
| 1 | Off | Close | Close | Off | Off | Off |
| 2 | Off | Close | Open | Off | Off | Off |
| 3 | Off | Close | Close | Off | Off | Off |
| 4 | Off | Open | Close | Off | Off | Off |
| 5 | Off | Close | Close | Off | Off | Off |
| 6 | On | Close | Close | Off | Off | Off |
| 7 | Off | Close | Close | Off | Off | Off |
| 8 | Off | Close | Close | On | Off | Off |
| 9 | Off | Open | Close | On | Off | Off |
| 10 | Off | Close | Close | Off | Off | Off |
| 11 | Off | Close | Close | Off | Activate | Off |
| 12 | Off | Close | Close | Off | Off | On |

In Table 1, the sequence outlined includes the following basic activities recorded by the controller 38 that are qualifying events:

1. Starting State—Engine Off
2. Rear door(s) Open/Close indicating placement of object on rear seat
3. Driver Door Open (may opening and closing multiple times)
4. Engine On,—Drive—Engine Off (Drive Cycle Completed)
5. Optional Display Shows Alert (Check back seat)
6. Drive Door Opens and Closes for Driver to leave vehicle
7. Timer Starts
8. No Change in Condition as count ends
9. Alert Device enabled (beep, horn, lights, vibration, etc.)

Once one of the rear doors 22 is opened, the alert device is disabled by the controller 38.

TABLE 2

| Sequence | System Condition<br>Engine | Driver Door | Rear Door(s) | Meter Display Alert | System Timer | Alarm Alert |
|---|---|---|---|---|---|---|
| 1 | Off | Close | Close | Off | Off | Off |
| 2 | Off | Close | Open | Off | Off | Off |
| 3 | Off | Close | Close | Off | Off | Off |
| 4 | Off | Open | Close | Off | Off | Off |
| 5 | On | Open | Close | Off | Off | Off |
| 6 | On | Close | Close | Off | Off | Off |
| 7 | Off | Close | Close | Off | Off | Off |
| 8 | Off | Close | Close | On | Off | Off |
| 9 | Off | Open | Close | On | Off | Off |
| 10 | Off | Close | Close | Off | Off | Off |
| 11 | Off | Close | Close | Off | Activate | Off |
| 12 | Off | Close | Close | Off | Off | On |

In Table 2, the sequence outlined includes the following basic activities recorded by the controller 38 that are qualifying events:

1. Starting State—Engine Off
2. Rear door(s) Open/Close indicating placement of object on rear seat
3. Driver Door Open (may opening and closing multiple times)
4. Engine Started
5. Driver door close (may opening and closing multiple times)
6. Drive Cycle Concludes (engine off)
7. Optional Display Shows Alert (Check back seat)
8. Drive Door Opens and Closes for Driver to leave vehicle
9. Timer Starts
10. No Change in Condition as count ends
11. Alert Device enabled (beep, horn, lights, vibration, etc.)

Once one of the rear doors 22 is opened, the alert device is disabled by the controller 38.

TABLE 3

| System Condition | | | | | | |
|---|---|---|---|---|---|---|
| Sequence | Engine | Driver Door | Rear Door(s) | Meter Display Alert | System Timer | Alarm Alert |
| 1 | Off | Close | Close | Off | Off | Off |
| 2 | Off | Close | Open | Off | Off | Off |
| 3 | Off | Close | Close | Off | Off | Off |
| 4 | Off | Open | Close | Off | Off | Off |
| 5 | Off | Close | Close | Off | Off | Off |
| 6 | On | Close | Close | Off | Off | Off |
| 7 | On | Open | Close | Off | Off | Off |
| 8 | On | Close | Open | Off | Off | Off |
| 9 | On | Open | Close | Off | Off | Off |
| 10 | On | Close | Close | Off | Off | Off |
| 11 | Of | Close | Close | Off | Off | Off |
| 12 | Off | Close | Close | On | Off | Off |
| 13 | Off | Open | Close | On | Off | Off |
| 14 | Off | Close | Close | Off | Off | Off |
| 15 | Off | Close | Close | Off | Activate | Off |
| 16 | Off | Close | Close | Off | Off | On |

In Table 3, the sequence outlined includes the following basic activities recorded by the controller 38 that are qualifying events:

1. Starting State—Engine Off
2. Rear door(s) Open/Close indicating placement of object on rear seat
3. Driver Door Open (may opening and closing multiple times)
4. Engine On
5. Drivers Door Open (may opening and closing multiple times)
6. Rear door(s) Open/Close indicating placement of object on rear seat (may opening and closing multiple times)
7. Drivers Door Open (may opening and closing multiple times)
8. Drive Cycle Concludes (engine off)
9. Optional Display Shows Alert (Check back seat)
10. Drive Door Opens and Closes for Driver to leave vehicle
11. Timer Starts
12. No Change in Condition as count ends
13. Alert Device enabled (beep, horn, lights, vibration, etc.)

Once one of the rear doors 22 is opened, the alert device is disabled by the controller 38.

TABLE 4

| System Condition | | | | | | |
|---|---|---|---|---|---|---|
| Sequence | Engine | Driver Door | Rear Door(s) | Meter Display Alert | System Timer | Alarm Alert |
| 1 | Off | Close | Close | Off | Off | Off |
| 2 | Off | Open | Close | Off | Off | Off |
| 3 | On | Open | Close | Off | Off | Off |
| 4 | On | Close | Close | Off | Off | Off |
| 5 | On | Close | Open | Off | Off | Off |
| 6 | On | Close | Close | Off | Off | Off |
| 7 | On | Open | Close | Off | Off | Off |
| 8 | On | Close | Close | Off | Off | Off |
| 9 | Off | Close | Close | Off | Off | Off |
| 10 | Off | Close | Close | On | Off | Off |
| 11 | Off | Open | Close | On | Off | Off |
| 12 | Off | Close | Close | Off | Off | Off |
| 13 | Off | Close | Close | Off | Activate | Off |
| 14 | Off | Close | Close | Off | Off | On |

In Table 4, the sequence outlined includes the following basic activities recorded by the controller 38 that are qualifying events:

1. Starting State—Engine Off
2. Drivers Door Open
3. Engine On
4. Drivers Door Closed
5. Rear door(s) Open/Close indicating placement of object on rear seat
6. Driver Door Open (may opening and closing multiple times)
7. Drive Cycle Concludes (engine off)
8. Optional Display Shows Alert (Check back seat)
9. Drive Door Opens and Closes for Driver to leave vehicle
10. Timer Starts
11. No Change in Condition as count ends
12. Alert Device enabled (beep, horn, lights, vibration, etc.)

Once one of the rear doors 22 is opened, the alert device is disabled by the controller 38.

In Table 5, the sequence outlined includes the following basic activities recorded by the controller 38 that are qualifying events:

TABLE 5

| System Condition | | | | | | |
|---|---|---|---|---|---|---|
| Sequence | Engine | Driver Door | Rear Door(s) | Meter Display Alert | System Timer | Alarm Alert |
| 1 | Off | Close | Close | Off | Off | Off |
| 2 | On (remote) | Close | Close | Off | Off | Off |
| 3 | On | Close | Open | Off | Off | Off |
| 4 | On | Close | Close | Off | Off | Off |
| 5 | On | Open | Close | Off | Off | Off |
| 6 | On | Close | Close | Off | Off | Off |
| 7 | Off | Close | Close | Off | Off | Off |
| 8 | Off | Close | Close | On | Off | Off |
| 9 | Off | Open | Close | On | Off | Off |
| 10 | Off | Close | Close | Off | Off | Off |
| 11 | Off | Close | Close | Off | Activate | Off |
| 12 | Off | Close | Close | Off | Off | On |

In Table 5, the sequence outlined includes the following basic activities recorded by the controller 38 that are qualifying events:

1. Starting State—Engine Off (Using Remote Start)
2. Rear door(s) Open/Close indicating placement of object on rear seat
3. Drivers Door Open (may opening and closing multiple times)
4. Drive Cycle Concludes (engine off)
5. Optional Display Shows Alert (Check back seat)
6. Drive Door Opens and Closes for Driver to leave vehicle
7. Timer Starts
8. No Change in Condition as count ends
9. Alert Device enabled (beep, horn, lights, vibration, etc.)

Once one of the rear doors 22 is opened, the alert device is disabled by the controller 38.

It should be understood that the above five tables and corresponding recorded events, are basic examples of qualifying events that can trigger the controller 38 to enable the alert device 36 to provide an alarm. Other scenarios are possible where those scenarios provide an indication that the vehicle operator has left an object or objects within the vehicle 10 and has apparently forgotten to retrieve that object or objects.

Second Embodiment

Figure 5:
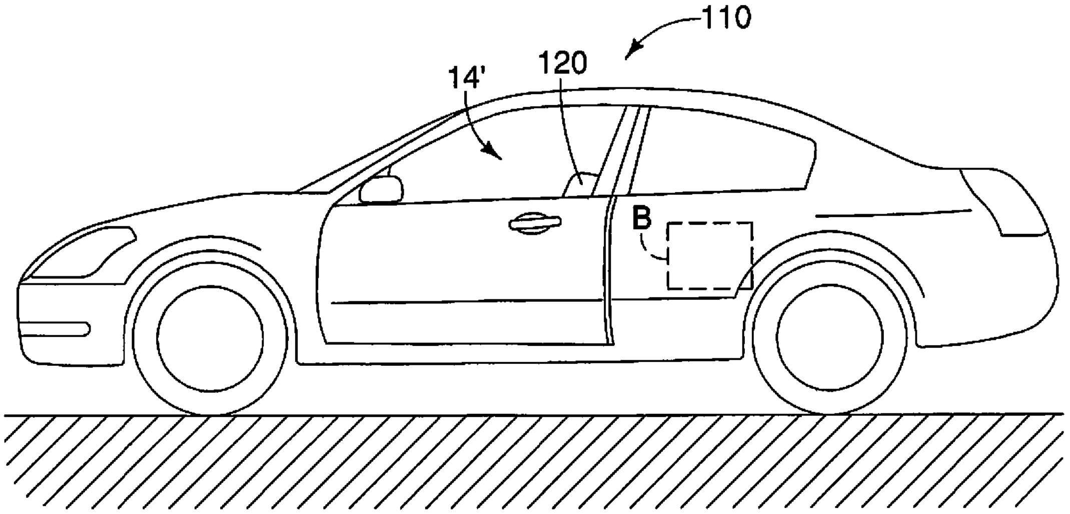
FIG. 5 is a side view of a two door vehicle that includes the activity monitoring apparatus in accordance with a second embodiment.
Figure 6:
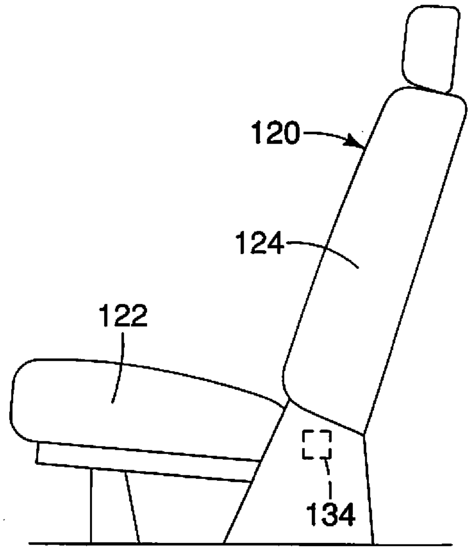
FIG. 6 is a side view of a front seat of the two door vehicle shown in FIG. 5 showing the front seat in a seating orientation in accordance with the second embodiment.
Figure 7:
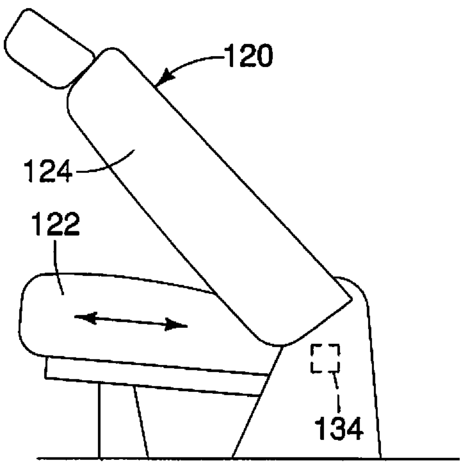
FIG. 7 is another side view of the front seat of the two door vehicle shown in FIG. 5 showing the front seat moved to a retracted orientation necessary to access a rearward seat within the vehicle in accordance with the second embodiment.

Referring now to FIGS. 5-7, a vehicle 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the vehicle 110 is a two door coupe and also includes the activity monitoring apparatus 16 as described above with respect to the first embodiment.

The vehicle 110 includes a vehicle body structure 12' defines a vehicle interior 14'. The vehicle 110 has front doors 20 whose movement is sensed by the movement detectors 32 as described above in the first embodiment. The vehicle 110 includes front seats 120 that have a seating portion 122 and a seat upright portion 124. Movement of the seating portion 122 and the seat upright portion 124 of the front seats 120 is sensed or detected by movement detectors 134.

In the second embodiment, the rearward area of the vehicle interior 14' must be accessed by moving one or both of the front seats 120. Specifically, the seating portion 122 can be moved forward to access the rearward area of the vehicle interior 14' and/or the seat upright portion 124 must be moved from an upright orientation (FIG. 6) to a retracted orientation (FIG. 7) in order to access the rearward area of the vehicle interior 14'.

In the second embodiment, the movement detectors 134 are configured to sense or detect movement of both the seating portion 122 and the seat upright portion 124 of the front seats 120. As shown in FIG. 3, the movement detectors 134 replace the movement detectors 34 of the first embodiment. Specifically, FIG. 3 and FIG. 4 are generic to both the first and second embodiments. The events of the first embodiment described with respect to movement of the rear doors 22 apply equally to detected movement of the seating portion 122 and the seat upright portion 124 of the front seats 120. Hence, the descriptions above directed to FIGS. 3 and 4 apply to the second embodiment as well.

Third Embodiment

Figure 8:
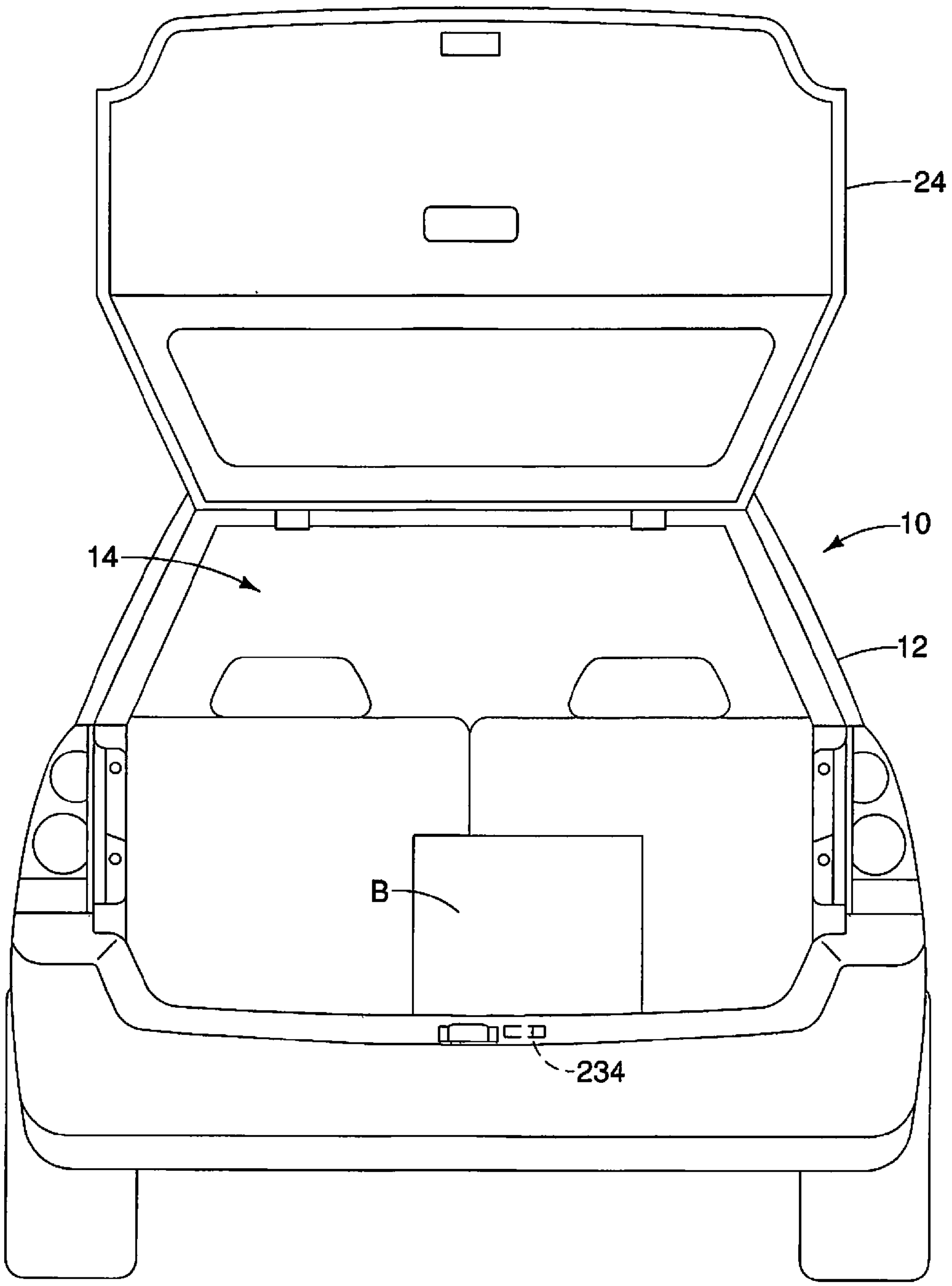
FIG. 8 is a rear view of a vehicle similar to the vehicle depicted in FIG. 1, showing a hatch door in an open position allowing movement of cargo and objects in and out of a rearward area of the vehicle in accordance with a third embodiment.

Referring now to FIG. 8, the vehicle 10 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the vehicle 10 is identical to the vehicle 10 described above with respect to the first embodiment. However, in the third embodiment, the rearward area of the vehicle interior 14 is a cargo area of the vehicle 10 accessed via the hatch door 24. A movement detector 234 is included in the vehicle 10 to monitor opening and closing of the hatch door. The vehicle 10 includes the activity monitoring apparatus 16 as described above with respect to the first embodiment, accept that the hatch door 24 is monitored for activity and events such as opening and closing of the hatch door 24 are monitored instead of opening and closing of the rear doors 22.

In the third embodiment, the focus of the activity monitoring apparatus 16 is to determine whether or not the vehicle operator has left an object B within the cargo area of the vehicle 10, accessed by opening and closing of the hatch door 24.

In the third embodiment, the movement detector 234 is configured to sense or detect movement of hatch door 24. As shown in FIG. 3, the movement detector 234 replaces the movement detectors 34 of the first embodiment. Specifically, FIG. 3 and FIG. 4 are generic to both the first and third embodiments. The events of the first embodiment described with respect to movement of the rear doors 22 apply equally to detected movement of the movement of the hatch door 24. Hence, the descriptions above directed to FIGS. 3 and 4 apply to the third embodiment as well.

The controller 38 preferably includes a microcomputer with an activity monitoring and recording control program that controls the alerting device 36. The controller 38 can also include other conventional components such as an input interface circuit, an output interface circuit, and storage devices such as a ROM (Read Only Memory) device and a RAM (Random Access Memory) device. The microcomputer of the controller 38 is programmed to control the activity monitoring apparatus 16. The memory circuit stores processing results and control programs such as ones for monitoring, recording, evaluating and processing operations that are run by the processor circuit. The internal RAM of the controller 38 stores statuses of operational flags and various control data, and can define the data storage 40, which stores the qualifying sequences, such as the information demonstrated in Tables 1-5. The internal ROM of the controller 38 stores the programming for various operations described above. It will be apparent to those skilled in the art from this disclosure that the precise structure and algorithms for the controller 38 can be any combination of hardware and software that will carry out the functions of the present invention.

The elements of the vehicles 10 and 110 other than the activity monitoring apparatus 16 are conventional components that are well known in the art. Since these vehicle elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the activity monitoring apparatus. Accordingly, these terms, as utilized to describe the present invention should be interpreted relative to a vehicle equipped with the activity monitoring apparatus.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle activity monitoring apparatus comprising:
a vehicle body structure defining a vehicle interior;
a vehicle front door fixed to the vehicle body structure for movement between an open orientation and a closed orientation;
a front door movement detection device configured to sense movement of the front door from the closed orientation to the open orientation and from the open orientation to the closed orientation;
a vehicle component attached to the vehicle body structure for movement between a first position exposing a rearward area of the vehicle interior and a second position at least partially concealing the rearward area of the vehicle interior;
a movement detection device installed within the vehicle body structure and coupled to the vehicle component sensing movement of the vehicle component between the first position and the second position;
a vehicle ignition device within the vehicle body structure operated by a vehicle operator to control operation of a vehicle engine;
an alerting device configured to provide an alarm signal; and
a controller operably connected to each of the front door movement detection device, the movement detection device, the vehicle ignition device and the alerting device, such that in response to the controller detecting a sequence of events based only on: movement of the front door via signals from the front door movement detection device; movement of the vehicle component via signals from the movement detection device; and detection of operation of the vehicle ignition device, the controller determines whether or not the vehicle operator has potentially left an object in the rearward area of the vehicle interior, where the determination does not require physical detection of the presence of the object and in response to determining that the vehicle operator has potentially left an object in the rearward area of the vehicle interior the controller operates the alerting device to provide the alarm signal to the vehicle operator.

2. The vehicle activity monitoring apparatus according to claim 1, wherein
the vehicle body structure defines at least one front door opening and at least one rear door opening, and
the vehicle component is a rear side door pivotally fixed to the vehicle body structure such that the first position is an open position exposing the rear door opening and exposing the rear area of the vehicle interior, and the second position is a closed position of the rear side door covering the rear door opening.

3. The vehicle activity monitoring apparatus according to claim 2, wherein
the movement detection device is a door switch configured to provide a signal in response to movement of the rear side door.

4. The vehicle activity monitoring apparatus according to claim 1, wherein
the vehicle body structure defines a two-door coupe, and
the vehicle component is a front seat installed within the vehicle interior such that the first position is a retracted orientation with at least a seatback of the front seat moved forward exposing the rear area of the vehicle interior behind the front seat and the second position is a seating orientation in which the seatback of the front seat is oriented for receiving a passenger in a seated position.

5. The vehicle activity monitoring apparatus according to claim 4, wherein the movement detection device is a seat switch configured to provide a signal in response to movement of at least one of the seatback and a seat section of the front seat.

6. The vehicle activity monitoring apparatus according to claim 1, wherein the vehicle component is a rear hatch door such that the first position is an open position exposing a cargo area of the vehicle interior and the second position is a closed position at least partially enclosing the cargo area.

7. The vehicle activity monitoring apparatus according to claim 6, wherein the movement detection device is a door switch configured to provide a signal in response to movement of the rear hatch door.

8. The vehicle activity monitoring apparatus according to claim 1, wherein the alerting device is installed within an instrument panel within the vehicle interior.

9. The vehicle activity monitoring apparatus according to claim 8, wherein the alerting device includes a display installed to the instrument panel within the vehicle interior and the alarm signal includes a visual signal provided on the display.

10. The vehicle activity monitoring apparatus according to claim 1, wherein the alerting device is installed within a keyfob operated by the vehicle operator.

11. The vehicle activity monitoring apparatus according to claim 1, wherein the alarm signal produced by the alerting device includes at least one or more of the following: a visual alarm, an audible alarm and a vibratory alarm.

12. A method for operating an activity monitoring apparatus comprising:

detecting movement of a vehicle component of a vehicle body structure between a first position exposing a rearward area of a vehicle interior of the vehicle body structure and a second position at least partially concealing the rearward area of the vehicle interior;

detecting operation of a vehicle ignition device within the vehicle body structure operated by a vehicle operator to control operation of a vehicle engine;

detecting movement of a front door indicating location of the vehicle operator;

determining whether or not the vehicle operator has potentially left an object in the rearward area of the vehicle interior in response to only: the detecting movement of the front door; the detecting movement of the vehicle component via signals from the movement detection device; and detecting operation of the vehicle ignition device, with the detecting of movement of the front door, detecting of movement of the vehicle component and detecting of operation of the vehicle ignition device occurring in a predetermined sequence of events, where the determination does not require physical detection of the presence of the object; and providing an alarm signal to the vehicle operator in response to determining that the vehicle operator has potentially left an object in the rearward area of the vehicle interior.

13. The method according to claim 12, wherein the detecting of the movement of the vehicle component includes the vehicle component being a rear side door pivotally fixed to the vehicle body structure such that the first position is an open position exposing the rear door opening and exposing the rear area of the vehicle interior, and the second position is a closed position of the rear side door covering the rear door opening.

14. The method according to claim 12, wherein the detecting of the movement of the vehicle component includes the vehicle component being a front seat installed within the vehicle interior such that the first position is a retracted orientation with at least a seatback of the front seat moved forward exposing the rear area of the vehicle interior behind the front seat and the second position is a seating orientation in which the seatback of the front seat is oriented for receiving a passenger in a seated position.

15. The method according to claim 12, wherein the detecting of the movement of the vehicle component includes the vehicle component being a rear hatch door such that the first position is an open position exposing a cargo area of the vehicle interior and the second position is a closed position at least partially enclosing the cargo area.

16. The method according to claim 12, wherein the providing the alarm signal to the vehicle operator includes at least one or more of the following: a visual alarm, an audible alarm and a vibratory alarm.

17. The vehicle activity monitoring apparatus according to claim 1, wherein the controller being configured such that the sequence of events includes the controller detecting the movement of the vehicle component prior to the controller detecting movement of the front door.

18. The vehicle activity monitoring apparatus according to claim 17, wherein the controller being configured such that the sequence of events further includes the controller detecting operation of the vehicle ignition device to start the vehicle engine after the controller detects the movement of the vehicle component.

19. The method according to claim 12, wherein the predetermined sequence of events of the determining whether or not the vehicle operator has potentially left an object in the rearward area of the vehicle interior includes detecting the movement of the vehicle component prior to detecting movement of the front door.

20. The method according to claim 19, wherein the predetermined sequence of events further includes detecting operation of the vehicle ignition device to start the vehicle engine after the controller detects the movement of the vehicle component.

* * * * *